United States Patent [19]

Tatusmi

[11] 4,307,708
[45] Dec. 29, 1981

[54] SOLAR HEATED BUILDING

[75] Inventor: Tadao Tatusmi, No. 7, Higashi 6-jo 6-chome, Asahikawa-shi, Hokkaido, Japan

[73] Assignee: Tadao Tatusmi, Hokkaido, Japan

[21] Appl. No.: 117,785

[22] Filed: Feb. 1, 1980

[30] Foreign Application Priority Data

Oct. 31, 1979 [JP] Japan ................................ 54-141133

[51] Int. Cl.³ ................................................. F24J 3/02
[52] U.S. Cl. ..................................... 126/428; 126/431; 126/437; 126/435
[58] Field of Search ............... 126/450, 435, 436, 430, 126/432, 445, 446, 428, 431; 165/48 S

[56] References Cited

U.S. PATENT DOCUMENTS 2,544,474  3/1951  Swanton, Jr. ......................... 126/430
4,170,221  10/1979  Gavin ................................... 126/446
4,192,454  3/1980  Rugenstein ........................... 126/437

Primary Examiner—James C. Yeung
Attorney, Agent, or Firm—Oblon, Fisher, Spivak, McClelland & Maier

[57] ABSTRACT

A solar heating system for a building is disclosed. The solar heating system includes a solar collector and conduits leading from the solar collector to a plurality of heat sinks. The conduits contain an antifreeze solution for carrying the heat from the solar collector to the heat sinks. One of the heat sinks is a hot water stock tank which is heated by coils of the conduit containing the antifreeze solution. Therefore, the hot water in the stock tank is only indirectly heated by solar energy. Other heat sinks include hot air space heaters in each room and a heat accumulation tank through which air may be passed for heating the air which is circulated to the rooms of the building. The building and the hot water stock tank are both well insulated.

4 Claims, 4 Drawing Figures

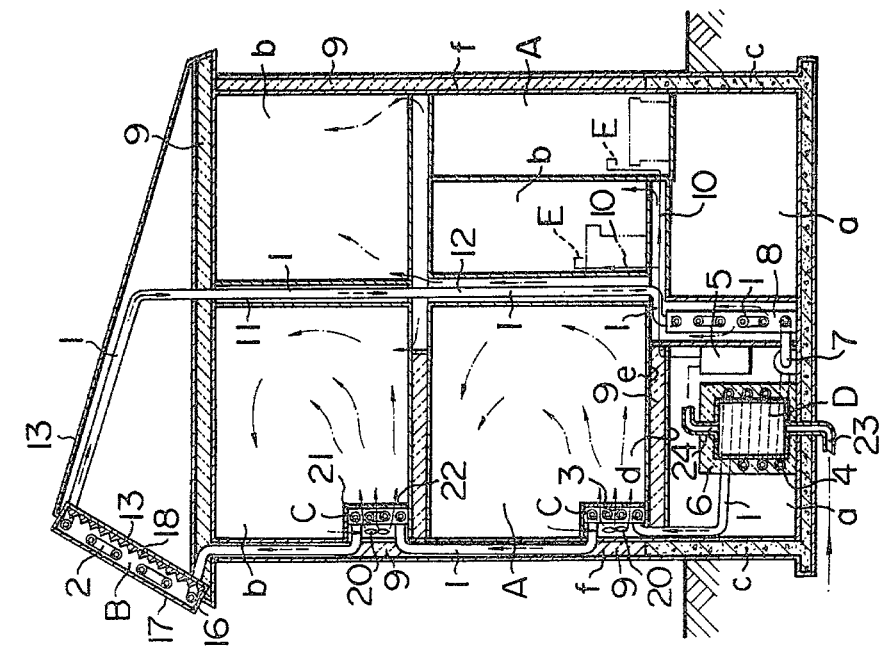
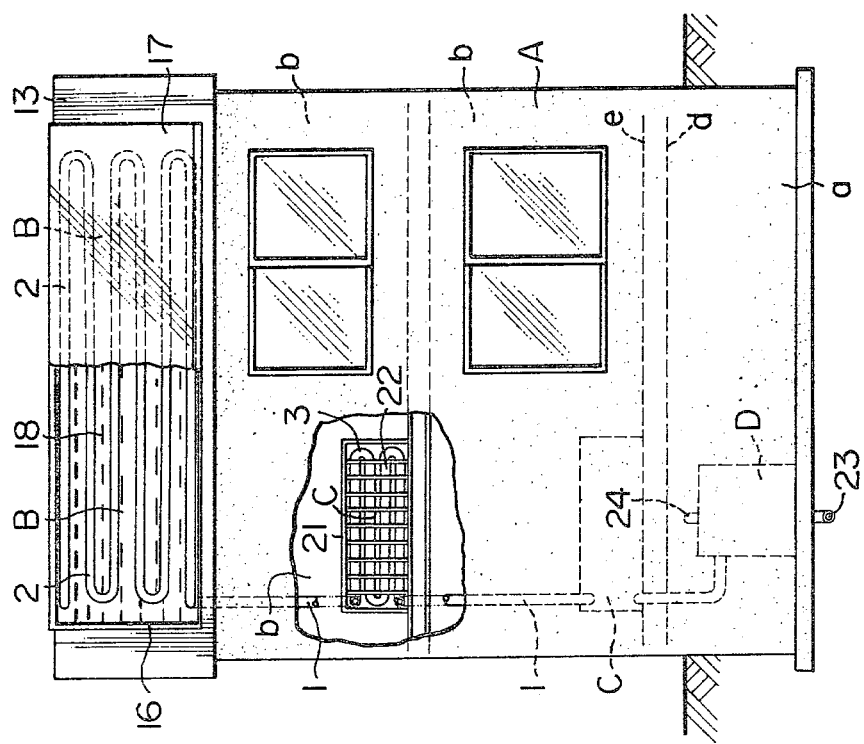

SOLAR HEATED BUILDING

BACKGROUND OF THE INVENTION

Previously, for space-heating in a building such as a residence and the like, space heaters have been installed respectively in the rooms or a hot-water circulation space-heater has been installed, but in these cases the fuel is expensive and the thermal performance is not effective relatively to the cost. Hot-water supply systems have been installed respectively in the rooms which need them, but hot-water of sufficiently high temperature is not obtained relatively to the cost of the fuel needed for the burner.

Recently, for a space-heating or hot-water supply system, fresh hot-water heated with solar heat has been directly provided to the space-heater or the hot-water supply system. But in cold regions, the pipes have broken occasionally by the freezing of the water because of the inclusion of fresh water in the circulation pipe system provided in the building. Further, fresh hot-water of a desired temperature for the space-heater or hot-water supply system has not been obtained because the hot-water heated with solar heat was not at a high enough temperature and was cooled during circulation. The supply of a large quantity of hot-water in a short time has also been difficult. Therefore it has been necessary to use a large-sized burner as an auxiliary space-heater or hot-water supply system. The duration of sunshine in the winter season in cold regions is short. Therefore the temperature of the fresh water increases only slightly, and hot-water of a high temperature heated with solar heat cannot be obtained. Thus, the conventional solar system is not useful for conservation of fuel.

SUMMARY OF THE INVENTION

This invention is intended to solve the abovementioned problems. Objects of this invention are to provide a solar building in which the fuel consumption is conserved, to effect the utilization of solar heat to elevate the performance of space-heating and hot-water supply, and to maximize energy conservation. According to the invention, this is done by providing complete insulation between inside and outside of the building, and by feeding the heating system with an antifreeze solution which is more difficult to freeze than fresh water and easier to raise in temperature by the utilization of solar heat. The antifreeze solution is introduced into the space-heaters from which desired hot air is sent to the rooms giving an effective space-heating. The system of this invention is different from the previous systems in which fresh water is fed directly to a solar heat collector.

Another feature of this invention is to provide a solar heated building by indirectly heating the water in the hot-water stock tank to obtain hot-water through the transferring of the heat collected in the solar collector to the hot-water stock tank, additionally heating the water by using a small-sized auxiliary burner, and feeding the thus obtained hot-water to a hot-water supply system. The system of this invention is different from the previous systems in which water in the hot-water stock tank is directly heated.

BRIEF DESCRIPTION OF THE DRAWINGS

Various other objects, features and attendant advantages of the present invention will be more fully appreciated as the same becomes better understood from the following detailed description when considered in connection with the accompanying drawings wherein like reference characters designate like or corresponding parts throughout the several views, and where:

FIG. 1 is a partial cutaway elevational view;

FIG. 2 is a vertical section side view;

DETAILED DESCRIPTION OF THE PREFERRED EMBODIMENTS

Figure 3:
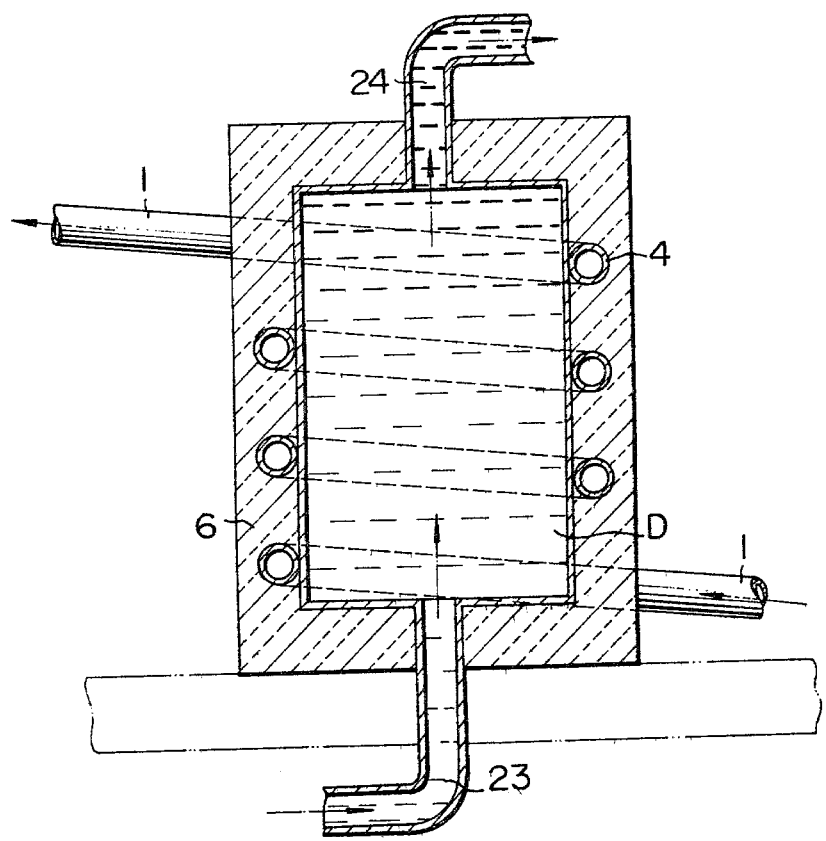
FIG. 3 is a partially enlarged vertical section side view.
Figure 4:
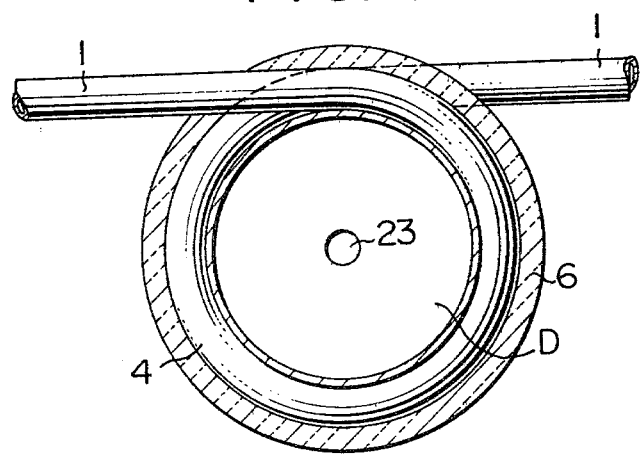
FIG. 4 is a partially enlarged transverse section side view.

Referring to the drawings, a building (A) is made of wood or concrete. A basement or a semibasement (a) is provided under the building, and in the semibasement (a) are provided a small-sized heater (5) (small-sized boiler) which uses little fuel, a hot-water stock tank (D) insulated with insulation (6), a circulation pump (7) forcing an antifreezing solution to circulate in a circulation pipe system (1), and a heat accumulating tank (8) having a capability of heat accumulation thereby preventing the cooling of the antifreeze solution in said circulation pipe system (1). The building (A) is constructed using side walls (c) of the semibasement (a) as a foundation. Between the ceiling board (d) of the semibasement (a) and the flooring (e) are an insulator (9) and a hot-water supply pipe system (1) connected to the hot-water tank (D) and the heat accumulating tank (8). Insulation (9) is provided on the inside of the outer wall (f) of the building (A) to insulate the conduction of heat to the atmosphere.

A pipe duct (11) through which the circulation pipe system (1) is vertically passed is provided inside the building (A). Along the pipe duct (11), hot-air paths (12) to the rooms (b) are formed. A solar heat collector (B) is installed on the sunny side of the roof surface (13) of the building (A) at an angle of 60° to 65° from the horizon to effectively absorb solar heat in the winter season and remove solar heat in the summer season. Openings of the hot-air paths (12) are provided on the floors (e) of the rooms, each of which is formed by partitioning the building (A) with parting strips (14). Hot-air space-heaters (C) connected to the circulation pipe system (1) are installed in the rooms.

The solar heat collector (B) is installed on the sunny side of the roof surface (13) of the building (A) at an angle of 60° to 65° from the horizon or vertically on the sunny side wall (f). The solar heat collector (B) has a wooden, plastic, or metal frame forming a box. On the front of the frame (16), a transparent glass plate or a transparent plastic plate (17) is fitted. On the bottom of the frame (16), a corrugated plate (18) coated with black heat-resisting paint is mounted to increase the receiving area. On the corrugated plate (18), a zigzag bent heat collecting pipe (2) coated with black heat-resisting paint is positioned throughout the area, the end of which is connected to the circulation pipe system (1) filled with an antifreeze solution to circulate the antifreeze solution through the heat collecting pipe (2).

In this system, the heat collecting pipe (2) is filled with an antifreeze solution differing from the fresh water in conventional systems. Therefore the temperature of the antifreeze solution increases to about 85° C. to 90° C. during sun shining hours while absorbing solar heat, and the heat collecting pipe (2) will not break by freezing of the antifreeze solution even when the atmospheric temperature decreases to −10° C. and the temperature in the solar heat collector (B) decreases to about 1° C. to 2° C. Circulation of the antifreeze solution is stopped thermostatically (the thermostat is not shown in the drawings) when the temperature of the antifreeze solution decreases, and the circulating pump (7) comes into operation automatically to circulate the antifreeze solution into the heat collecting pipe (2) when the antifreeze temperature increases. Thus absorbed solar heat can be utilized effectively for space-heating and hot-water supply of the building (A).

Hot-air space heaters (C) are installed in rooms which need space-heating. In the space heaters (C), a hot-air pipe (3) bent zigzag at an appropriate interval is mounted and connected to the circulation pipe system (1). A fan (20) is provided behind the pipe to blow against the heated hot-air pipe (3) and to feed the blown air into the room (b) from the blast openings (22) provided on the frame (21) of the hot-air space-heater (C). Thus, the room (b) is space-heated.

In the summer season, the circulation of the antifreeze solution heated with solar heat from the circulation pipe system (1) to the hot-air pipes (3) is discontinued by operating valves (not shown in the drawings) provided on the circulation pipe system (1).

The hot-water stock tank (D) is made of reinforced plastic or stainless steel, on which a heating pipe (4) is coiled adjacent to the outside wall or inside wall. Both ends of the heating pipe (4) are connected to the circulation pipe system (1). On the top of, and the bottom of, the tank, a feeding pipe (23) to feed fresh water and an outlet pipe (24) to deliver hot water are respectively provided. An insulation (6) is attached in a manner to cover the coiled heating pipe (4). Therefore, the fresh water in the hot-water stock tank (D) is heated indirectly by the hot antifreeze solution circulating in the coiled heating pipe (4). The resulting hot-water is insulated by insulator (6) and fed to the hot-water supply system (E). The hot-water supply system (E) connects the outlet pipe (24) of the hot-water stock tank (D) and the hot-water supply pipes (10) extending to rooms which need hot water, such as the kitchen, bath room and the like, and feeds the pipes 10 hot water heated in the hot-water stock tank (D).

The plastic circulation pipe system (1), connected to the heat collecting pipe (2) of the solar heat collector (B) to circulate the antifreeze solution filled in the system, is connected to the hot-air pipes (3) of the hot-air space-heaters (C) and the heating pipe (4) of the hot-water stock tank (D), and extends throughout the building (A). Therefore, the antifreeze solution in the circulation pipe system (1) circulates through said pipes (2), (3) and (4). The hot antifreeze solution heated to about 80° C. to 90° C. with solar radiation while passing through the heat collecting pipe (2) is circulated by the driving force of the circulating pump (7) to the heating pipe (4) where fresh water in the hot-water stock tank (D) is heated, and to the hot-air pipes (3) of the hot-air space-heaters (C) where the hot-air is heated and the hot air is sent to the rooms by the fans (20), and returns to the heat collecting pipe to form a closed circulation path. The hot antifreeze solution is stocked in the heat accumulating tank (8), and sends hot air to the rooms through the hot-air paths (12). When the temperature of the antifreeze solution decreases below 30° C. when the sun is not shining, operation of the circulating pump (7) is discontinued, and the small-sized burner (5) is activated and heats the water in the hot-water stock tank (D) to effect the hot-water supply system (E) to feed hot water. The burner also heats the antifreeze solution in the heat accumulating tank (8) to circulate the antifreeze solution into the hot-air pipes (3) of the hot-air space-heater (C) through valves (not shown in the drawings). Thus, the rooms (b) are space-heated.

In a season when space-heating is not needed i.e. during the summer, the antifreeze solution flow into the hot air pipe (3) is discontinued by operation of valves which are provided between the circulation pipe system (1) and the hot-air pipe (3). Thus, the rooms remain unheated. Therefore only the hot-water supply system utilizes the solar heat in the summer season.

In this invention, a circulation pipe system is filled with an antifreeze solution to prevent a decrease in the temperature of the pipe and to increase and maintain the temperature of the pipe. The antifreeze solution is circulated to indirectly heat fresh water in the hot-water stock tank, thereby differing from conventional systems in which fresh water is heated directly. Thus hot water free from impurities can be obtained in the hot-water stock tank. The hot antifreeze solution is fed to hot-air space-heaters where hot air is generated and ventilated to the rooms. Thus the rooms can be maintained in a warm condition. When the temperature of the antifreeze solution decreases below 30° C., a small-sized burner comes into operation, but the fuel needed for the burner can be conserved because the temperature of the antifreeze solution is readily elevated with only a small amount of fuel. On the other hand, in the summer season when space-heating is not needed, the hot water in the hot-water stock tank is maintained at an elevated temperature without consumption of fuel by utilization of only the solar heat collector, and is usable for a kitchen and bath room without any additional heating.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A solar heating system for a building, comprising:
a solar heat collector;
at least two solar heat sinks;
means communicating said solar heat collector and said at least two solar heat sinks, said means including a first conduit extending from said collector to one of said at least two sinks, a second conduit extending from said one of said at least two sinks to a second one of said two sinks and a third conduit extending from said second one of said two sinks to said collector, said conduits containing a solution including a non-aqueous liquid having a freezing temperature lower than that of water, means for circulating said solution in said conduits, means for transferring the heat from said collector to said solution, and means for transferring the heat from said solution to said at least two sinks, wherein said one of said at least two heat sinks is a hot water stock tank having a hot water outlet and the means for transferring heat from said solution to said stock tank is a plurality of coils of said first conduit in contact with said stock tank; and wherein said second one of said at least two heat sinks is a hot air heat accumulation tank, and said means for transferring heat from said solution to said heat accumulation tank is a plurality of coils of said first conduit in said accumulation tank; and a small heater or boiler for heating said hot water outlet and said hot air heat accumulation tank.

2. The system of claim 1 wherein a third one of said at least two heat sinks is a hot air space heater in each room of said building and said means for transferring heat from said solution to said space heaters is a fan adjacent said space heaters for blowing air adjacent said first conduit.

3. The system of claim 1 including a plurality of hot air passages leading from said heat accumulation tank to the rooms of said building for distributing heat from said heat accumulation tank to said rooms.

4. The system of claim 1 wherein said non-aqueous liquid is antifreeze.

* * * * *